United States Patent
Li et al.

(10) Patent No.: US 10,282,806 B2
(45) Date of Patent: May 7, 2019

(54) GRAPHICS ACCELERATOR

(71) Applicant: MediaTek Inc., Hsinchu (TW)

(72) Inventors: Yen-Hsiang Li, Hsinchu (TW); Jih-Ming Hsu, Taoyuan (TW); Yen-Lin Lee, Zhubei (TW); Chih-Yu Chang, Hsinchu (TW); Chiung-Fu Chen, Hsinchu (TW); Chih-Chung Cheng, Taipei (TW); Chung-Min Kao, Taipei (TW); Che-Ming Hsu, Toufen Township (TW)

(73) Assignee: MediaTek, Inc., Hsinchu (TW)

( * ) Notice: Subject to any disclaimer, the term of this patent is extended or adjusted under 35 U.S.C. 154(b) by 36 days.

(21) Appl. No.: 15/134,279

(22) Filed: Apr. 20, 2016

(65) Prior Publication Data
US 2017/0308988 A1    Oct. 26, 2017

(51) Int. Cl.
*G06T 1/20* (2006.01)
*G06T 3/60* (2006.01)
*G06T 1/60* (2006.01)

(52) U.S. Cl.
CPC .................. *G06T 1/20* (2013.01); *G06T 1/60* (2013.01); *G06T 3/60* (2013.01)

(58) Field of Classification Search
CPC ......... G06T 15/005; G06T 1/20; G06T 15/04; G09G 5/363; G06F 9/3851
USPC ....................................................... 345/522
See application file for complete search history.

(56) References Cited

U.S. PATENT DOCUMENTS

| | | | | |
|---|---|---|---|---|
| 5,649,173 A | * | 7/1997 | Lentz | G06T 1/20 345/501 |
| 6,493,008 B1 | * | 12/2002 | Yui | G09G 5/08 348/E5.104 |
| 7,450,123 B1 | * | 11/2008 | Kilgard | G06T 15/04 345/426 |
| 2003/0142104 A1 | | 7/2003 | Lavelle et al. | |
| 2013/0127849 A1 | | 5/2013 | Marketsmueller et al. | |
| 2014/0176529 A1 | | 6/2014 | Meixner et al. | |
| 2015/0371431 A1 | * | 12/2015 | Korb | G06T 9/00 382/113 |
| 2016/0171661 A1 | * | 6/2016 | Baentsch | G06F 1/1632 345/649 |

* cited by examiner

*Primary Examiner* — Gordon G Liu
(74) *Attorney, Agent, or Firm* — Tong J. Lee (57) ABSTRACT

A graphics accelerator device offloads the workload of a graphics processing unit (GPU) by performing image composition and other specialized functions. The graphics accelerator device includes a rasterization module to rasterize a set of primitives to a set of pixels and generate information of the set of pixels. The graphics accelerator device also includes intra-process module to retrieve pixel values from a memory according to the information received from the rasterization module, perform mathematical calculations on the pixel values, and generate one or more processed image layers. The graphics accelerator device further includes an inter-process module to composite the one or more processed image layers received from the intra-process module with other image layers retrieved from the memory, and output a composited image to a display.

20 Claims, 6 Drawing Sheets

GRAPHICS ACCELERATOR

TECHNICAL FIELD

Embodiments of the invention relate to a graphics processing system; and more specifically, to a hardware accelerator that accelerates the rendering and composition of graphical images.

BACKGROUND

In computer graphics, rendering is the process of producing images on a display device from descriptions of graphical objects or models. A graphics processing unit (GPU) renders 2D and 3D graphical objects, which are often represented by a combination of primitives such as points, lines, polygons, and higher order surfaces, into picture elements (pixels).

A GPU typically includes a rendering pipeline for performing rendering operations. A rendering pipeline includes the following main stages: (1) vertex processing, which processes and transforms the vertices (that describe the primitives) into a projection space, (2) rasterization, which converts each primitive into a set of pixels aligned with the pixel grid of the display with attributes such as position, color, normal and texture, (3) fragment processing, which processes each individual set of pixels, and (4) output processing, which combines the pixels of all primitives into a 2D display space.

Modern mobile devices typically offer advanced graphics capabilities. Popular mobile operating systems includes Android™, iOS™, Windows®, etc. These operating systems support a variety of graphics Application Programming Interfaces (APIs) for 2D and 3D graphics. In a mobile device, an image producer such as a GPU processes graphics commands from a graphics API to produce graphical images. A displayed image (i.e., a frame) may be the result of multiple image producers, each of which produces one or more layers of images such as the home screen, status bar, and system user interface (UI). Each image producer passes its produced image layer (also referred to as a surface) to a graphics buffer. A composing utility, such as SurfaceFlinger in Android™, is responsible for compositing the multiple image layers from the graphics buffers into a frame for the display.

In conventional graphics systems, the GPU not only produces images but also supports the operations of image composition. In some cases, the composition operations may take a significant amount of GPU resources away from its image producing tasks. For example, when launching a video game, rotating a screen, jumping back to a previous frame, or when other time-constrained and computation-intensive graphics events take place, the GPU may be called upon to perform image composition. Since the display screen has a fixed refreshing frequency (e.g., 60 Hz) marked by a periodic VSYNC signal, a heavily-loaded GPU may not be able to keep up with the refreshing speed and may cause some frames to be dropped. Therefore, there is a need to mitigate the GPU workload and to improve graphics rendering performance.

SUMMARY

In one embodiment, a graphics accelerator device is provided. The graphics accelerator device comprises: a rasterization module to rasterize a first set of primitives to a first set of pixels and generate information of the first set of pixels; an intra-process module to retrieve pixel values from a memory according to the information received from the rasterization module, perform mathematical calculations on the pixel values, and generate one or more processed image layers; and an inter-process module to composite the one or more processed image layers received from the intra-process module with other image layers retrieved from the memory, and output a composited image to a display.

In another embodiment, a method performed by a graphics accelerator device is provided. The method comprises: rasterizing, by a rasterization module, a first set of primitives to a first set of pixels to generate information of the first set of pixels; retrieving, by an intra-process module, pixel values from a memory according to the information received from the rasterization module; performing, by the intra-process module, mathematical calculations on the pixel values to generate one or more processed image layers; and compositing, by an inter-process module, the one or more processed image layers received from the intra-process module with other image layers retrieved from the memory to thereby output a composited image to a display.

According to embodiments described herein, a graphics accelerator device supports a variety of graphics operations with high efficiency and minimal system memory access such that the performance of graphics rendering can be significantly improved.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a system, device and method for accelerating graphics rendering operations. The system includes a CPU, a GPU and a hardware graphics accelerator (also referred to as a "graphics accelerator device" or an "accelerator"), among other components. The accelerator has a fractional size of the GPU and consumes a fractional amount of power of the GPU. The accelerator can operate in several operation modes, including but not limited to: a composition mode, a rendering mode and a virtual reality mode. In the composition mode, the accelerator composites the image layers generated by multiple image producers. The composited image is sent to a display device for display. As mentioned before, using a GPU to perform image composition not only incurs substantial overhead but also ties up GPU resources from performing rendering tasks. By contrast, the accelerator of the disclosed system includes dedicated hardware for image composition and is able to perform image composition with high efficiency. Accordingly, the accelerator speeds up graphics processing and enables the system to meet the timing requirement for displaying frames. Furthermore, the accelerator in the rendering mode assists the GPU with graphics rendering, and in the virtual reality mode uses GPU's rendered content to produce time-warped images. Thus, the workload of the GPU can be further reduced.

In one embodiment where the system operates according to the Android™ framework, the accelerator includes a fixed hardware pipeline that performs the operations of SurfaceFlinger and HWComposer in Android™. Although the Android™ framework is used as an example in the following description, it is understood that embodiments of the accelerator supports graphics operations and various hardware displays in various different operating environments.

Additionally, the accelerator includes hardware for performing a number of specialized functions such as image rotation in the composition mode and time-warp thread operations in the virtual reality mode. As an example, image rotation may take place when a user of a mobile device rotates his/her device screen. The rotation occurs in real-time and may take any arbitrary angle. The accelerator can rotate image layers at any given angle. The accelerator operations can be performed with minimal memory access; for example, the accelerator may directly pass its output to the display without accessing the system memory such as the dynamic random access memory (DRAM). Minimized memory access increases the overall performance of the accelerator.

In the virtual reality mode, the accelerator includes hardware to perform time-warping thread operations. Time-warping is a technique in virtual reality that warps an image before sending it to the display to correct for the head or eye movement that occurs after content rendering. In one embodiment, the time-warping thread operations may include chromatic aberration correction and lens distortion correction to correct for chromatic distortion and spatial distortion, respectively. The chromatic distortion and spatial distortion are optical aberrations caused by light passing through two wide-angle lenses on a head-mount device, where the lenses are provided for a user to view a display. The spatial distortion causes a rectangular image to be perceived with pin-cushion distortion. The chromatic distortion causes different color channels to be perceived as misaligned. In one embodiment, the accelerator may post-process an image rendered by the GPU to correct these optical aberrations. The post-processing may include mathematical calculations and/or table lookups according to known mathematical formulas.

In the rendering mode, the accelerator supports a subset of GPU's rendering capabilities; for example, the accelerator may perform operations according to inputs from graphics Application Programming Interfaces (APIs) such as Android™ HWUI and OpenGL for Embedded Systems (GLES), but does not support complex and computation intensive calculations such as depth calculations. UI objects implemented by HWUI are generally fast, responsive and smooth. GLES is a subset of the OpenGL graphics APIs for rendering 2D and 3D computer graphics. Both HWUI and GLES are typically hardware-accelerated. The HWUI and GLES are used herein as non-limiting examples; it is understood that the accelerator may perform rendering operations according to the inputs from other APIs that do not involve depth calculations.

Figure 1:
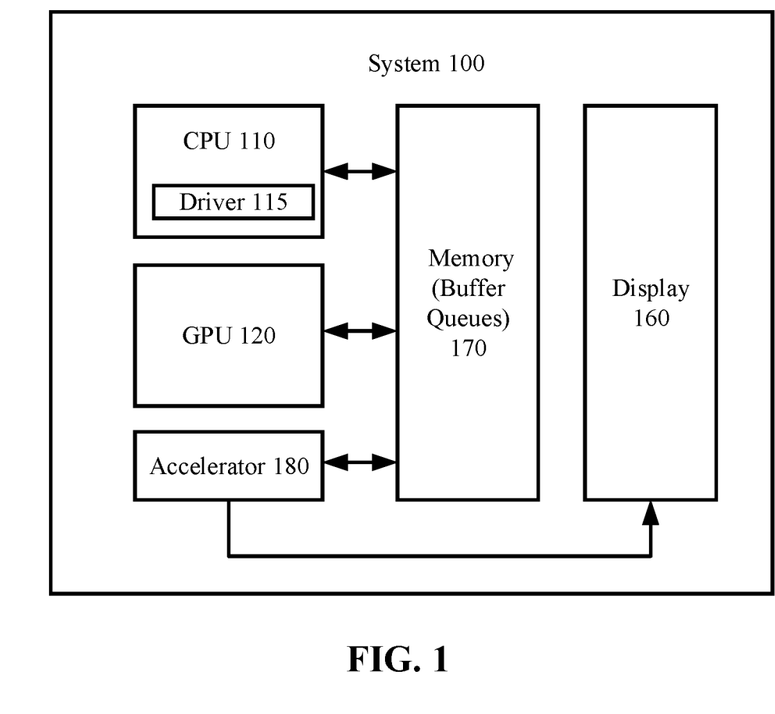
FIG. 1 illustrates a system that performs graphics rendering operations according to one embodiment.

FIG. 1 illustrates a system 100 that includes a CPU 110, a GPU 120, an accelerator 180 according to one embodiment. Although only one CPU, one GPU and one accelerator are shown, it is understood that the system 100 may include any number of CPUs, GPUs and accelerators, as well as any number of general-purpose and special-purpose processors. It is understood that many other system components are omitted herein for simplicity of illustration.

In one embodiment, the system 100 may be implemented as a system-on-a-chip (SoC). In one embodiment, the system 100 may be part of a mobile computing and/or communication device (e.g., a smartphone, a tablet, a laptop, etc.). In another embodiment, the multiprocessor system 100 may be part of server computer. Each CPU 110 may include multiple CPU cores and each GPU may include multiple GPU cores. In one embodiment, the CPU 110, the GPU 120 and the accelerator 180 communicate with a memory 170 (e.g., DRAM or other volatile or non-volatile random-access memory). The memory 170 includes a number of buffer queues for the image producers and consumers to pass graphics data to each other. In one embodiment, the image producers include the CPU 110, the GPU 120, the accelerator 180 as well as other image producing components in the system 100, and the image consumers include at least the accelerator 180.

In one embodiment, each of the CPU 110, the GPU 120 and the accelerator 180 may generate one or more image layers for a display 160. The generated image layers may be temporarily stored in the memory 170 before being composited by the accelerator 180 for the display 160. More specifically, the CPU 110 performs general-purpose computing tasks, and may execute simple (e.g., 2D) drawing instructions to draw graphical images. For complex graphical operations, the CPU 110 may issue graphics commands via one or more graphics APIs for the GPU 120 to execute. The GPU 120 renders graphical objects, as directed by the graphics commands, into pixels that are aligned with the pixel grids of the display 160. The graphical objects may include 2D and 3D graphical objects, and may be represented by a combination of primitives such as points, lines, polygons, and higher order surfaces. In one embodiment, the GPU 120 (more specifically, each GPU core) includes shader hardware for perform shading operations such as vertex shading, fragment shading and blending. One example of the shader hardware is a unified shader that can be programmed to perform the various shading operations. The shader hardware includes an array of arithmetic logic units (ALUs) that execute instructions provided in shader programs. These shader programs can be written in high-level languages such as OpenGL Shading Language (GLSL), High-Level Shading Language (HLSL) in Direct3D, or C for Graphics (Cg), etc.

In one embodiment, the GPU 120 may offload some of the rendering operations to the accelerator 180 in the render mode; for example, the rendering operations of HWUI and GLES inputs without depth calculations. The accelerator 180 in the composition mode may perform mathematical calculations on the pixels of an image layer to generate a rotated image, and may composite multiple image layers into a frame for display. The accelerator 180 in the virtual reality mode may perform time-warping thread operations. In each of these operation modes, the accelerator 180 may operate with minimal memory access and high computing efficiency. In one embodiment, the display 160 displays the composited image from the accelerator 180 at a fixed refreshing frequency (e.g., 60 Hz) marked by a periodic sync signal (e.g., VSYNC). With the accelerator 180, the timing requirement imposed by the VSYNC can generally be met by the system 100 and the number of dropped frames can be minimized.

Accordingly, the accelerator 180 may be both an image producer and an image consumer. For example, the accelerator 180 may produce a system UI image layer, and may also rotate an already-produced image layer. The image layers produced and/or processed by the accelerator 180 may be composited by the accelerator 180 with other image layers produced by other image producers. The accelerator 180 performs the image producing and/or consuming operations on demand; for example, the performed operations depend on the operation mode of the accelerator, which in turn depends on the applications being run on the system 100 and the UI input.

In one embodiment, the CPU 110 executes a driver 115 that determines the operation mode of the accelerator 180. For example, the driver 115 may determine that the accelerator 180 is to assist the GPU 120 with rendering when the accelerator 180 has the capacity to do so. On the other hand, if the accelerator 180 is occupied with the task of image composition, image rotation, or time-warp thread operations, the driver 115 may determine not to engage the accelerator 180 with the rendering tasks.

In one embodiment, the accelerator 180 does not have a programmable shader, and does not have the hardware for handling depth (i.e., z-buffer) in 3D graphics rendering. Instead, to maximize computing efficiency, the accelerator 180 has a fixed hardware pipeline that handles graphics such as system UI, image composition and image layer processing. Accordingly, the accelerator 180 is much smaller in size than the GPU 120 and consumes much less power. By offloading these simpler tasks to the accelerator 180, the GPU 120 may focus on more complex 3D graphics rendering. Therefore, the process of graphics rendering is streamlined and the number of dropped frames, if any, can be greatly reduced.

Figure 2:
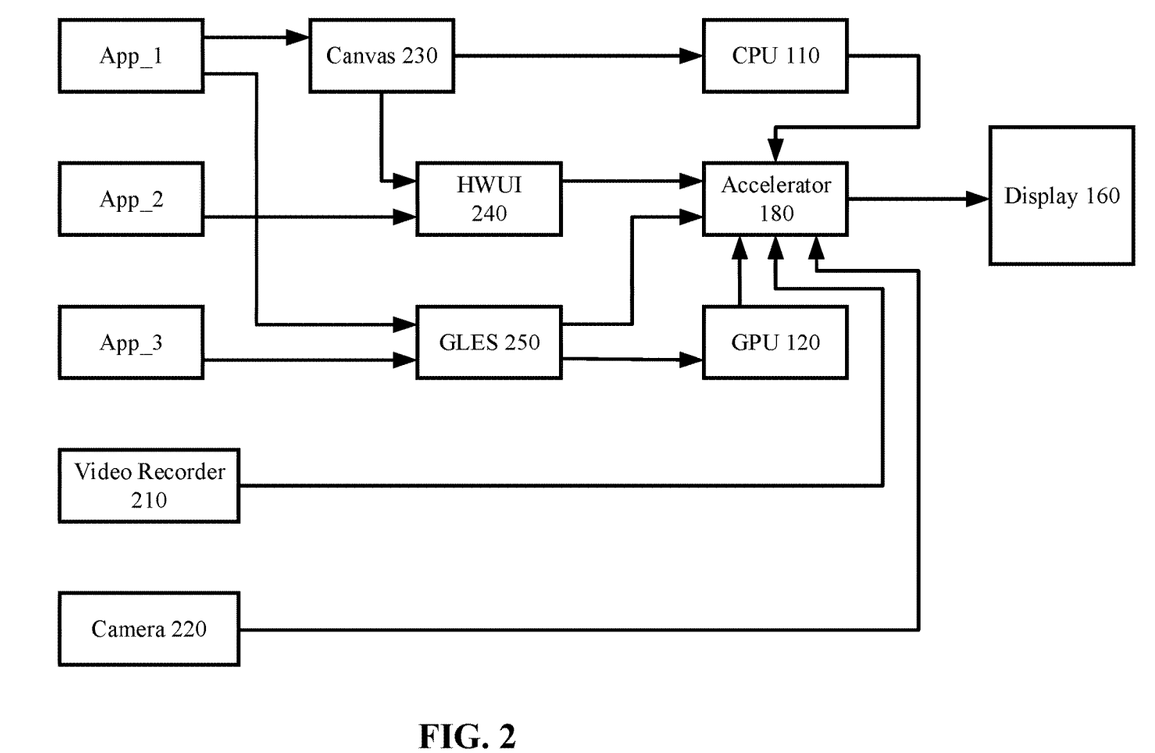
FIG. 2 illustrates interaction between system components according to one embodiment.

FIG. 2 is a diagram illustrating the interaction between the accelerator 180 and other system components according to one embodiment. In this example, applications App_1, App_2 and App_3 are three applications that run on the system 100 (FIG. 1) to generate graphical images on the display 160. App_1 may be a HyperText Markup Language (HTML) based Web page, which uses a first graphics API (e.g., Canvas 230) to draw 2D graphical objects. App_1 also uses a second graphics API (e.g., GLES 250) to draw 2D and 3D graphical objects. App_2 may be another Web page that uses a third graphics API (e.g., HWUI 240) to draw system UI objects (e.g., status bar, menu items, etc.). App_3 may be a graphics application that uses GLES 250 to generate animated 3D graphics or video. An API may invoke another API: for example, Canvas 230 may invoke HWUI 240 to generate system UI objects. Depending on the features of the API being invoked, the API inputs may be executed by the CPU 110, the GPU 120, or the accelerator 180. As mentioned above with reference to FIG. 1, the accelerator 180 may assist rendering operations by rendering the inputs from the HWUI 240 and GLES 250. The accelerator 180 may also perform post-processing by operating on the images generated by itself, the CPU 110, the CPU 120 and image capturing devices such as a video recorder 210 and a camera 220. Although not shown in FIG. 2, it is understood that graphics data may be passed among the CPU 110, the CPU 120, the video recorder 210, the camera 220, the accelerator 180 and the graphics APIs 230, 240, 250 through buffer queues in the memory 170 of FIG. 1.

Figure 3:
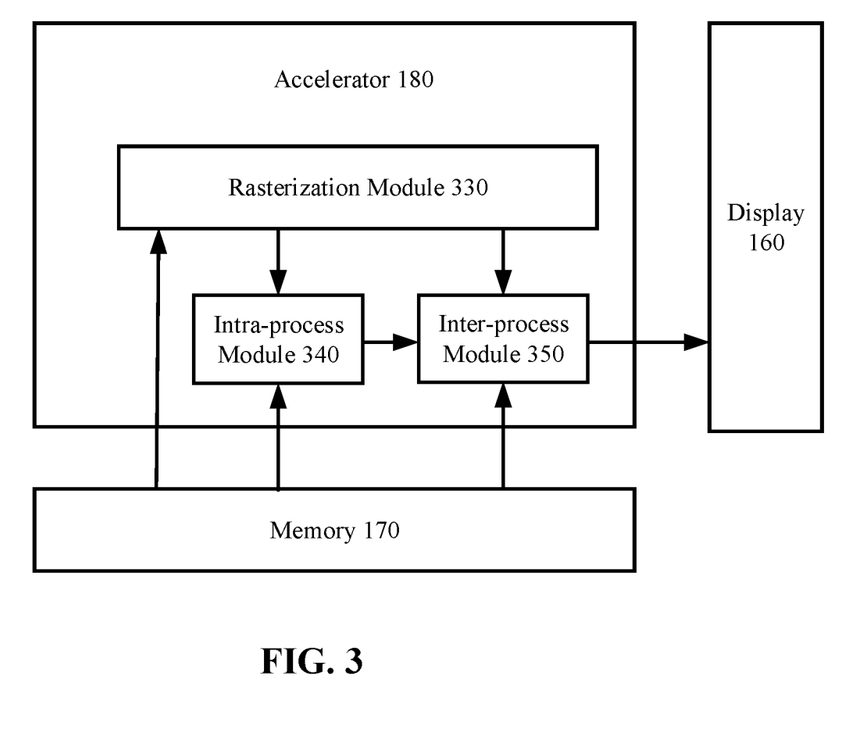
FIG. 3 illustrates a graphics accelerator device according to one embodiment.

FIG. 3 illustrates the accelerator 180 according to one embodiment. In this embodiment, the accelerator 180 is shown to include hardware for operating in the composition mode. The hardware is shown in FIG. 3 as functional blocks, some of which may include overlapping hardware components. Some functional blocks may be omitted from the drawing for simplicity of illustration. It is understood that in alternative embodiments, the accelerator 180 may include fewer, additional, and/or different functional blocks from what is shown in FIG. 3.

In this embodiment, the accelerator 180 in the composition mode performs image rotation and image composition. The accelerator 180 uses a rasterization module 330 to retrieve primitive data from the memory 170. The primitive data describes the primitives of one or more image layers. The rasterization module 330 rasterizes the primitives into pixels, and generates an output to an intra-process module 340. More specifically, the output of the rasterization module 330 includes information of the pixels, which, among other things, specifies memory locations of the pixels to be processed by the intra-process module 340. The output is sent to the intra-process module 340 directly without passing through the memory 170. The intra-process module 340 retrieves the values of the pixels within the same image layer from the memory locations, and performs mathematical operations (e.g., interpolating, averaging, summing, subtracting, etc.) on the pixel values. In one embodiment, the output of the intra-process module 340 is a rotated image layer, which is sent to an inter-process module 350 for further processing. As mentioned before, the accelerator 180 may rotate any number of image layers at any given angle. The given angle may be determined or selected at runtime from one of a set of angles including acute angles, obtuse angles and a plurality of other angles including 90°, 180° and 270° angles. The mathematical operations performed by the intra-process module 340 may depend on the rotation angle. In another embodiment, the output of the intra-process module 340 is a scaled image layer, which is sent to an inter-process module 350 for further processing.

In one embodiment, the pixel values retrieved by the intra-process module 340 may belong to the image layers produced by the CPU 110, the GPU 120, the accelerator 180 (in the rendering mode) and/or image capturing devices such as the video 210 and the camera 220. If these image layers can be displayed as is with image composition but without rotation, scaling or other special intra-layer processing (i.e., processing within the same image layer), then the intra-process module 340 may be bypassed. If these image layers need further processing in addition to image composition before being displayed, the intra-process module 340 is used to perform intra-layer processing on these image layers. In one embodiment, the rasterization module 330 informs the intra-process module 340 which memory locations store the pixel values to be used for generating a pixel in the rotated or scaled image layer. Then the intra-process module 340 interpolates or combines the pixel values according to a predetermined mathematical formula for a given rotation angle or a given scaling factor.

For example, upon receiving a command to rotate the display screen, the rasterization module 330 may retrieve the primitive data of each image layer to be rotated, rasterize the primitives into pixels aligned with the rotated display screen, and generate information of the pixels. When there are multiple image layers to be rotated, the intra-process module 340 performs mathematical operations one image layer at a time according to the pixel information from the rasterization module 330, and outputs the rotated image layers to the inter-process module 350. The rotated image layers may be outputted one layer at a time, or a portion of a layer at a time. The inter-process module 350 receives the output from the intra-process module 340 and performs image composition of the rotated image layers. In one embodiment, the inter-process module 350 may composite the rotated image layers, a layer at a time as each layer comes in, or one portion of a layer at a time as each portion comes in. In one embodiment, the composition of the rotated image layers is sent to the display 160.

In one embodiment, the inter-process module 350 may also retrieve pixel values of a set of one or more image layers from the memory 170 according to the pixel positions (i.e., pixel coordinates on the display screen) received from the rasterization module 330. The set of image layers may be generated by the CPU 110, the GPU 120, the accelerator 180 (in the rendering mode) and/or image capturing devices such as the video 210 and the camera 220. In one embodiment, the inter-process module 350 may composite the output image layers from the intra-process module 340 with the set of image layers, and send the composited image to the display 160 directly without passing through the memory 170. Alternatively, when there is no intra-layer processing performed by the intra-process module 340, the inter-process module 350 may composite the set of image layers by themselves and send the composited image to the display 160.

Figure 4:
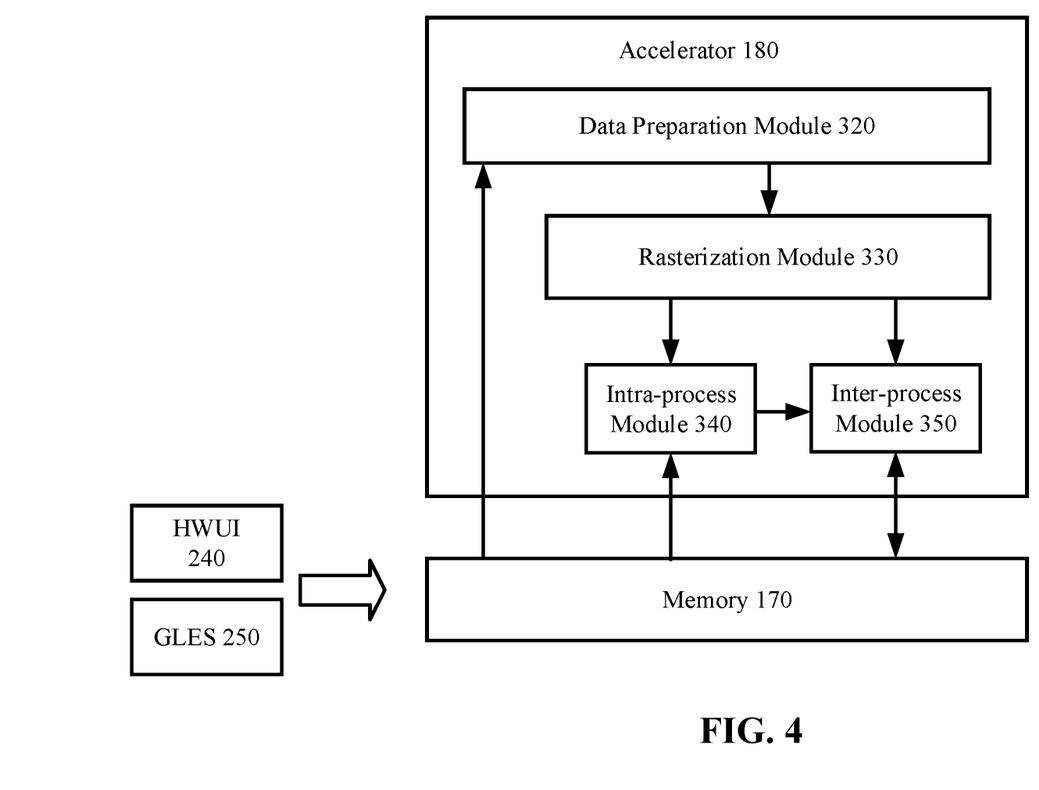
FIG. 4 illustrates a graphics accelerator device according to another embodiment.

FIG. 4 illustrates functional blocks of the accelerator 180 according to another embodiment. In this embodiment, the accelerator 180 is shown to include hardware for operating in the rendering mode. To assist the GPU 120 with graphics rendering, in this embodiment, the accelerator 180 uses a data preparation module 320 to load graphics API input from the memory 170. Examples of the API input include, but are not limited to, the input from the HWUI 240 and/or the GLES 250. In one embodiment, the data preparation module 320 includes an interface that is optimized for fast data retrieval, and inter-operable with the shader language used by the GPU 120, e.g., the OpenGL ES shader language.

The data preparation module 320 pre-processes the graphics API input, and outputs the processed primitive data to the rasterization module 330. The pre-processing performed by the data preparation module 320 may include converting the graphics API's description of graphical objects (e.g., vertices) into primitives. The rasterization module 330 rasterizes the primitive data into a set of pixels that are aligned with the pixel grid of the display 160. The rasterization module 330 does not perform depth (e.g., z-buffer) calculations.

In one embodiment, the output of the rasterization module 330 includes memory locations of the pixels, which are sent to an intra-process module 340 and the inter-process module 350 for further processing. The output is sent to the intra-process module 340 and the inter-process module 350 directly without passing through the memory 170. The intra-process module 340 performs mathematical operations on the pixels within the same image layer, and the inter-process module 350 performs mathematical operations on the pixels across different image layers. Both the intra-process module 340 and the inter-process module 350 may retrieve pixel values from the memory 170 according to the memory locations and perform mathematical operations on the retrieved pixel values. In one embodiment, the intra-process module 340 and the inter-process module 350 may perform alpha-blending, texture and color processing, among other rendering operations. The inter-process module 350 may operate on the pixel output from the intra-process module 340 as well as the pixel values retrieved from the memory 170. The output of the inter-process module 350 may be stored in the memory 170 for further post-processing; for example, image rotation and/or image composition by the accelerator 180 as described with reference to FIG. 3.

Figure 5:
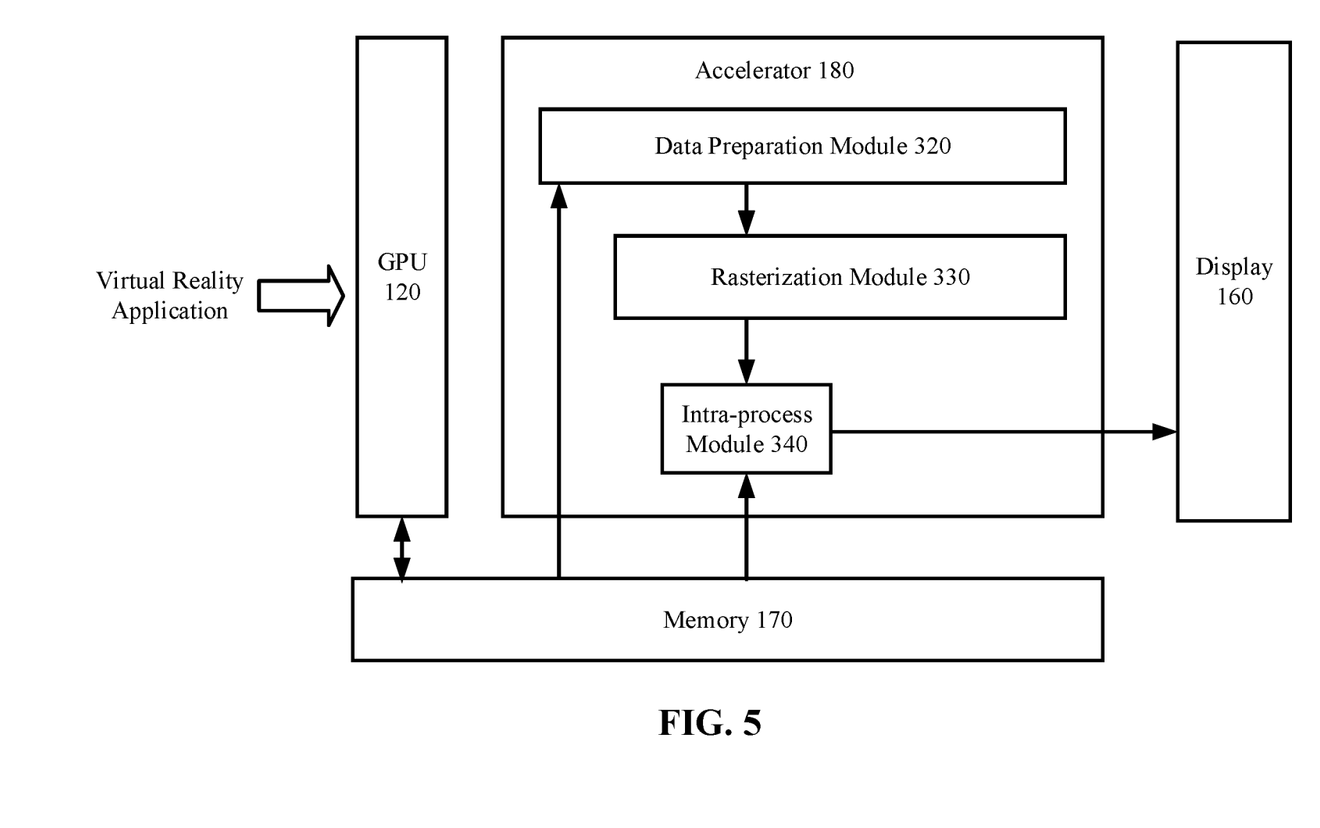
FIG. 5 illustrates a graphics accelerator device according to yet another embodiment.

FIG. 5 illustrates another embodiment of the accelerator 180 in which the accelerator 180 performs virtual reality operations such as time-wrapping thread operations. In this embodiment, the accelerator 180 is shown to include hardware for operating in the virtual reality mode. In one embodiment, the virtual reality operations may include at least two main threads: a content rendering thread performed by the GPU 120 and a time-wrapping thread performed by the accelerator 180. The time-wrapping thread operations may include, but are not limited to, positional translation, image distortion, pixel interpolation, lens distortion correction, chromatic aberration correction, and any combination of the above. In this embodiment, the GPU 120 first performs content rendering that renders a set of primitives describing a scene into pixels. The result of the content rendering may be temporarily stored in the memory 170. The data preparation module 320 retrieves a description of the graphical objects to be time-wrapped (e.g., the vertices of the graphical objects) and time-warp information (e.g., the eye coordinates, the head-mount device coordinates, etc.), and outputs the primitives representing the graphical objects along with the time-warp information to the rasterization module 330. The rasterization module 330 rasterizes the primitives into pixels according to the time-warp information, accounting for the lens distortion correction and chromatic distortion correction. In one embodiment, the rasterization module 330 rasterizes the primitives in each color channel (e.g., red, green and blue) separately, and generates the information of the pixels in each color channel incorporating each color channel's scaling factor as well as the lens distortion factor. The scaling factor of each color channel may be predetermined to compensate for the different refractive indices of the different color channels. The lens distortion factor may also be predetermined to compensate for the lens distortion of the head-mount device. The information of the pixels is sent to the intra-process module 340 directly without passing through the memory 170.

In one embodiment, the information of pixels informs the intra-process module 340 the memory locations of the pixel values to retrieve. The intra-process module 340 retrieves pixel values of each color channel from the memory locations and performs mathematical calculations on the pixel values according to at least the scaling factor of each color channel and the lens distortion factor. The pixel values may be the results of the GPU's 120 content rendering. The output of the intra-process module 340 is time-warped pixels of combined color channels. The intra-process module 340 sends the time-warped pixels to the display 160, e.g., the display of a head-mount device, directly without passing through the memory 170.

It is noted that in the aforementioned embodiments, the output of the accelerator 180 directly feeds into the display 160 without passing through the memory 170. The term "directly" herein means that data travels between hardware modules without passing through the system memory, which may be an off-chip DRAM. In some embodiments, data may travel directly between the functional modules and be temporarily buffered in an on-chip buffer, such as a static random access memory (SRAM) buffer or other forms of low-latency on-chip memory buffer. For example, the output of the rasterization module 330 goes directly to the intra-process module 340 (FIGS. 3, 4 and 5) and the inter-process module 350 (FIGS. 3 and 4), without passing through the memory 170. Similarly, the output of the data preparation module 320 directly goes to the rasterization module 330 (FIGS. 4 and 5), and the output of the intra-process module 340 directly goes to the inter-process module 350 (FIGS. 3 and 4). Furthermore, the output of the inter-process module 350 directly goes to the display 160 (FIG. 3) and the output of the intra-process module 340 directly goes to the display 160 (FIG. 5). The reduced system memory access significantly increases the system performance.

Although FIGS. 3, 4 and 5 show different functional modules in the accelerator 180, it is understood that the accelerator 180 may include all of the functional modules shown in FIGS. 3, 4 and 5. Each of FIGS. 3, 4 and 5 only shows the functional modules used for a specific operation mode, and other functional modules that are not used for the specific operation mode are omitted.

Figure 6:
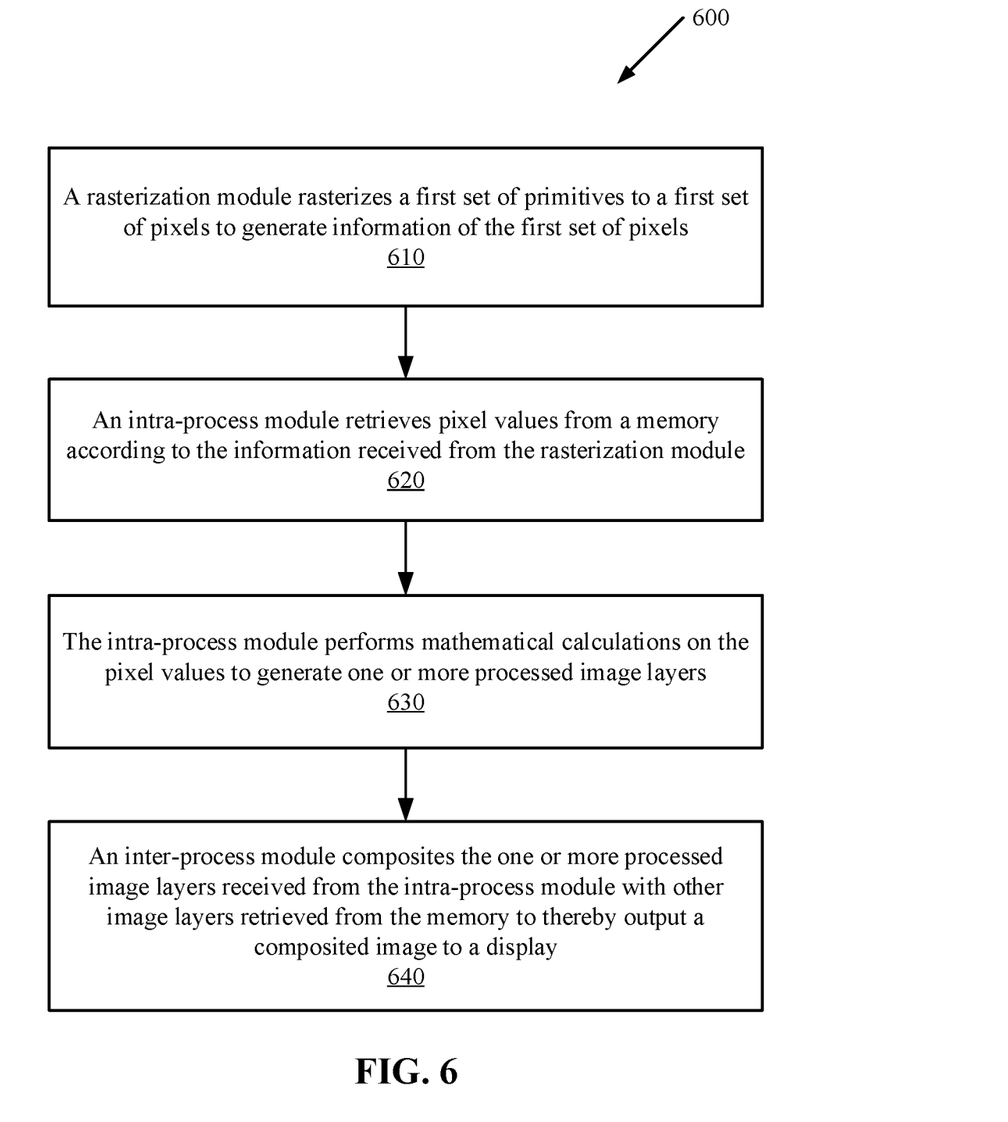
FIG. 6 is a flow diagram illustrating a method of a graphics accelerator device according to one embodiment.

FIG. 6 illustrates a flow diagram of a method 600 performed by the accelerator 180 according to one embodiment. Referring also to FIG. 3, in one embodiment, the method 600 begins when the rasterization module 330 rasterizes a first set of primitives to a first set of pixels to generate information of the first set of pixels (block 610). The intra-process module 340 retrieves pixel values from a memory according to the information received from the rasterization module (block 620) and performs mathematical calculations on the pixel values to generate one or more processed image layers (block 630). The inter-process module 350 composites the one or more processed image layers received from the intra-process module 340 with other image layers retrieved from the memory to thereby output a composited image to a display (block 640).

The method 600 may be performed by hardware (e.g., circuitry, dedicated logic, programmable logic, microcode, etc.), software (e.g., instructions run on a processing device), or a combination thereof. In one embodiment, the method 600 is performed by the accelerator 180 of FIGS. 1-5. In one embodiment, the accelerator 180 may be part of a mobile computing and/or communication device (e.g., a smartphone, a tablet, laptop, etc.). In one embodiment, the accelerator 180 may be part of a server system or a cloud computing system.

The operations of the flow diagram of FIG. 6 have been described with reference to the exemplary embodiments of FIGS. 1-5. However, it should be understood that the operations of the flow diagram of FIG. 6 can be performed by embodiments of the invention other than those discussed with reference to FIGS. 1-5, and the embodiments discussed with reference to FIGS. 1-5 can perform operations different than those discussed with reference to the flow diagram of FIG. 6. While the flow diagram of FIG. 6 shows a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A graphics accelerator device coupled to a graphics processing unit (GPU) via a memory, the graphics accelerator device operative to mitigate workload of the GPU, comprising:
a rasterization module, in response to runtime rotation of a display, to rasterize a first set of primitives to a first set of pixels which are aligned with a pixel grid of the display rotated at runtime, and to store the first set of pixels in memory locations;
an intra-process module to retrieve pixel values from the memory locations according to information received from the rasterization module, perform mathematical calculations on the pixel values to rotate one image layer at a time to generate rotated image layers according to the runtime rotation of the display; and
an inter-process module to composite the rotated image layers received from the intra-process module with other image layers retrieved from memory according to pixel coordinates of the display received from the rasterization module, and output a composited image to the display.

2. The graphics accelerator device of claim 1, wherein the rotated image layers are rotated by an angle selected at runtime from one of a set of angles including acute angles, obtuse angles and a plurality of other angles.

3. The graphics accelerator device of claim 1, wherein the information generated by the rasterization module specifies memory locations of the pixel values, and the intra-process module is operative to retrieve the pixel values from the memory locations to form the rotated image layers.

4. The graphics system of claim 1, wherein the inter-process module is further operative to receive pixel positions from the rasterization module, and retrieve the other image layers from the memory according to the pixel positions.

5. The graphics system of claim 1, wherein the inter-process module is further operative to directly output the information of the pixels to the display without going through the memory.

6. The graphics accelerator device of claim 1, wherein the other image layers are generated by one or more of a set of hardware devices including a central processing unit (CPU), a graphics processing unit (GPU), a camera, and a video recorder.

7. The graphics accelerator device of claim 1, further comprising:
a data preparation module to load a graphics application programming interface (API) input from the memory, generate data describing a second set of primitives according to the graphics API input, and send the data to the rasterization module.

8. The graphics accelerator device of claim 7, wherein the rasterization module is further operative to rasterize the second set of primitives into a second set of pixels, and the intra-process module and the inter-process module are operative to perform mathematical operations on the second set of pixels without performing depth calculations.

9. The graphics accelerator device of claim 1, further comprising:
a data preparation module to load time-warp information from the memory, and send data describing a third set of primitives to the rasterization module;
the rasterization module to rasterize the third set of primitives into a third set of pixels and output pixel data; and
the intra-process module to retrieve GPU rendered pixel values from the memory according to the pixel data, perform a set of mathematical calculations for time-warping thread operations on the GPU rendered pixel values, and generate a time-warped image to the display.

10. The graphics accelerator device of claim 9, wherein the time-warping thread operations include one or more of positional translation, image distortion, pixel interpolation, lens distortion correction, and chromatic aberration correction.

11. A method performed by a graphics accelerator device coupled to a graphics processing unit (GPU) via a memory, the graphics accelerator device operative to mitigate workload of the GPU, comprising:
rasterizing, by a rasterization module in response to runtime rotation of a display, a first set of primitives to a first set of pixels which are aligned with a pixel grid of the display rotated at runtime, to store the first set of pixels in memory locations;
retrieving, by an intra-process module, pixel values from the memory locations according to information received from the rasterization module;
performing, by the intra-process module, mathematical calculations on the pixel values to rotate one image layer at a time to generate rotated image layers according to the runtime rotation of the display; and
compositing, by an inter-process module, the rotated image layers received from the intra-process module with other image layers retrieved from memory according to pixel coordinates of the display received from the rasterization module to thereby output a composited image to the display.

12. The method of claim 11, wherein the rotated image layers are rotated by an angle selected at runtime from one of a set of angles including acute angles, obtuse angles and a plurality of other angles.

13. The method of claim 11, wherein retrieving the pixel values by the intra-process module further comprises:
retrieving the pixel values from memory locations to form the rotated image layers, wherein the memory locations are specified in the information generated by the rasterization module.

14. The method of claim 11, further comprising:
receiving, by the inter-process module, pixel positions from the rasterization module; and
retrieving, by the inter-process module, the other image layers from the memory according to the pixel positions.

15. The method of claim 11, wherein rasterizing by the inter-process module further comprises:
directly outputting the information of the pixels to the display without going through the memory.

16. The method of claim 11, wherein the other image layers are generated by one or more of a set of hardware devices including a central processing unit (CPU), a graphics processing unit (GPU), a camera, and a video recorder.

17. The method of claim 11, further comprising:
loading, by a data preparation module, a graphics application programming interface (API) input from the memory;
generating, by the data preparation module, data describing a second set of primitives according to the graphics API input; and
sending the data to the rasterization module.

18. The method of claim 17, further comprising:
rasterizing, by the rasterization module, the second set of primitives into a second set of pixels; and
performing, by the intra-process module and the inter-process module, mathematical operations on the second set of pixels without performing depth calculations.

19. The method of claim 11, further comprising:
loading, by a data preparation module, time-warp information from the memory;
sending, by the data preparation module, data describing a third set of primitives to the rasterization module;
rasterizing, by the rasterization module, the third set of primitives into a third set of pixels and output pixel data;
retrieving, by the intra-process module, GPU rendered pixel values from the memory according to the pixel data; and
performing, by the intra-process module, a set of mathematical calculations for time-warping thread operations on the GPU rendered pixel values to generate a time-warped image to the display.

20. The method of claim 19, wherein the time-warping thread operations include one or more of positional translation, image distortion, pixel interpolation, lens distortion correction, and chromatic aberration correction.

* * * * *